INVENTOR.
Edward W. N. Boosey
BY
ATTORNEY.

July 21, 1931.  E. W. N. BOOSEY  1,815,394
PRESSURE RELIEF VALVE
Filed Dec. 29, 1928  2 Sheets-Sheet 2
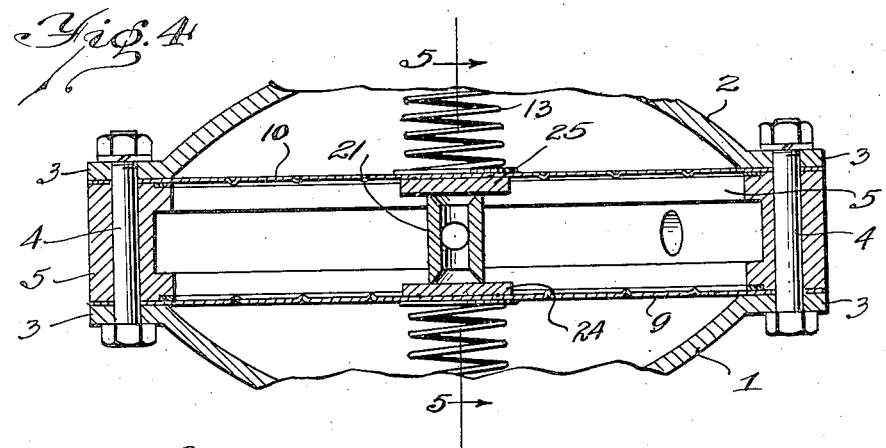
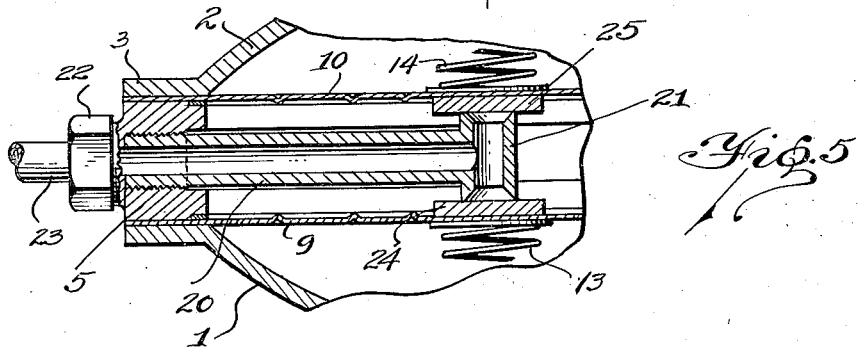
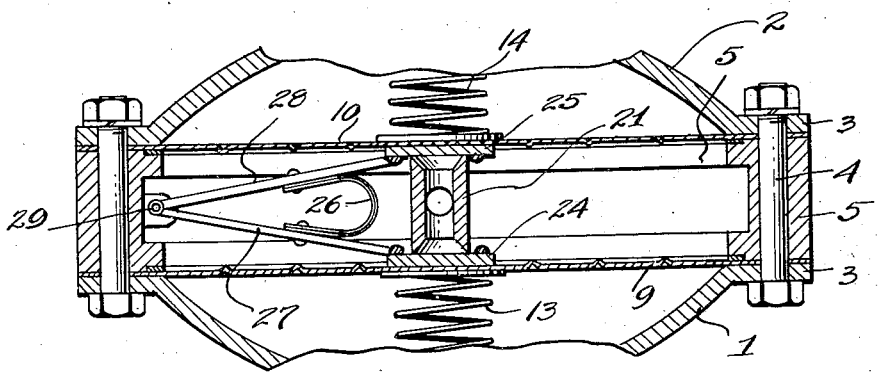
INVENTOR.
Edward W. N. Boosey.
BY
ATTORNEY.

Patented July 21, 1931

1,815,394

UNITED STATES PATENT OFFICE

EDWARD W. N. BOOSEY, OF DETROIT, MICHIGAN

PRESSURE RELIEF VALVE

Application filed December 29, 1928. Serial No. 329,235.

This invention relates to pressure relief valves for water lines in buildings, and its object is to provide a simple and efficient device of non-corrosive character whereby the device is made practically indestructible and a further purpose of the invention is to provide a structure of such character that once installed it does not thereafter require repair or adjustment and therefore a device that may be located in an inaccessible portion as the wall of a building for instance although the structure is not confined to such position of use.

In water lines entering a building frequently occurs what is known as "water hammer" occasioned by the sudden shutting off of the flow of water and many devices have been utilized for the purpose of relieving this "hammer" or shock. Also, in such water lines pressure may develop therein from other causes whereby the pressure in the lines continues to increase and further in such water installations in which a hot water tank is included it oftentimes happens that the means by which the tank is heated is continued in operation until steam is produced and therefore a pressure in excess of water pressure causing the hot water to back up in the system.

It is a purpose of this invention to provide a means for relieving a continued pressure as well as what is known as "water hammer" and thus the invention contemplates the use of a means in conjunction with the fundamental structure to provide a leakage in the system when pressure has increased to a certain predetermined extent and further to cause a leakage in the system when the temperature of the water entering the device is sufficiently high to cause an undesirable effect.

The invention therefore is three-fold in its purpose and may be incorporated in three forms of structure all involving the same fundamental characteristics as is hereinafter described.

An object of the invention is to provide a construction into which the water of the system freely enters between two diaphragms which are held from flexing by normal water pressures and adjustable to permit use under different normal water pressures.

These and other objects and novel features of the invention are hereinafter more fully described and claimed, and the preferred form of construction of a pressure relief valve embodying my invention is shown in the accompanying drawings in which—

Fig. 4 is a vertical section showing the invention in another form.

Fig. 5 is a section taken on line 5—5 of Fig. 4.

Fig. 6 is another form of the device included with which is a thermostatic element wherein leakage may be occasioned through temperature of the water entering the device.

Figure 2:
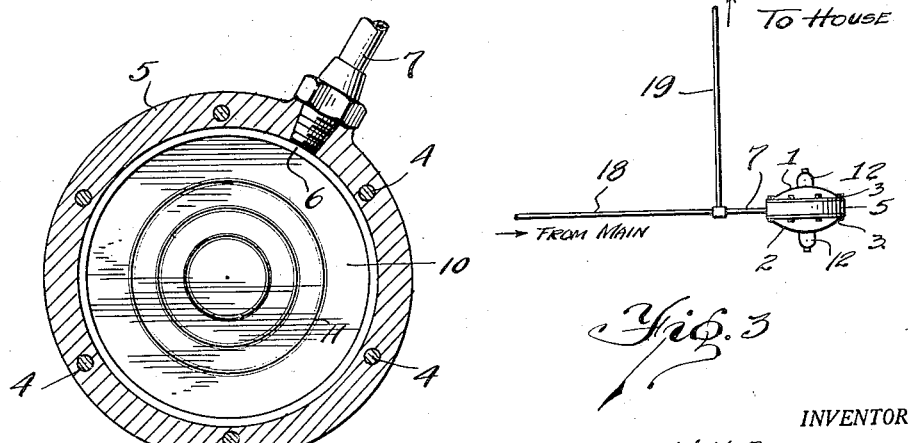
Fig. 2 is a section on a reduced scale taken on line 2—2 of Fig. 1.

In its simplest form the invention consists of two similar dome like shells 1 and 2 of semi-spherical form and having similar peripheral flanges 3, 3 apertured to receive the bolts 4 of which there are several as will be understood from Fig. 2. Between the flanges of these two shells is a brass ring 5 having an inlet aperture 6 with which the conduit 7 of the water system may be connected and which has apertures to receive the bolts 4 by means of which it may be assembled with the shells 1 and 2. Each opposite side face of this brass ring may be provided with a packing ring 8 and on the opposite side faces of the ring are positioned the flexible copper disks 9 and 10 respectively which preferably are corrugated as indicated at 11 to permit ready flexing of the diaphragms under pressure of water entering through the inlet 6. A plate 15 may be positioned between the ends of the springs and the respective diaphragm and there is also provided a plate like element 16 at the ends of the adjusting screws 17 which extend through threaded apertures in the ends of the portions 12 in these shells.

These screws provide means for adjusting the tension of the springs and it is to be understood that these springs are of such tension as to prevent flexing of the diaphragms 9 and 10 under normal water pressure. For instance, if the pressure be thirty or forty pounds per square inch the tension of these springs is correspondingly adjusted to counteract such normal pressure.

Figure 3:
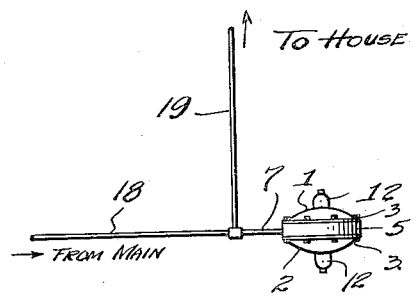
Fig. 3 is a diagram showing one manner of use of the valve in a water line.

This device may be used at any convenient place in the system. One method of connecting the device in the system is shown in Fig. 3 in which the main entering the building is indicated at 18 and the line to the house system is indicated by 19 the pipe 7 leading to the point of junction between the main and house lines. This device may be made of various sizes depending upon the particular service with which it is to be used or position of use and therefore is not confined to the particular location indicated in Fig. 3 but may be at or near the end of any house line in which case the conduit connecting the device with the line in which the faucet is located is preferably of a length to enable the device to be placed out of sight in the wall. It is possible to thus position the device in an inaccessible place due to the fact that all the parts with which the water comes in contact are non-corrosive in character as the copper disks and the brass ring and even the pipe line or the coupling by which the same is connected to the device may be made of brass so that any necessity of repair of the device is obviated.

Figure 1:
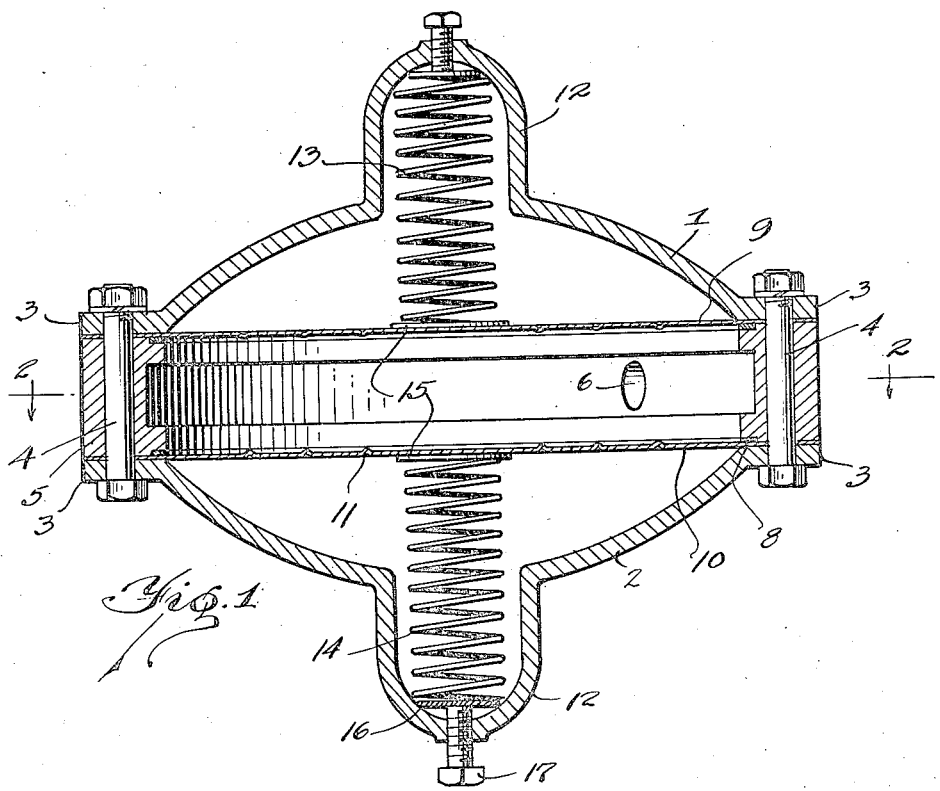
Fig. 1 is a vertical section showing the invention in its primary form.

The only other element of the structure in which necessity of repair might arise is the springs and these are not in such position as to be corroded by water entering the device and are shielded from atmosphere in the chamber formed between the diaphragms and the respective shell. Thus to a major extent deterioration of the springs is prevented and therefore when once installed this device will automatically perform its function without attention. The structure shown in Fig. 1 is the simplest form of a structure involving my invention and with such structure any sudden pressure developed in the water line with which the device is connected increases the pressure of the water between the diaphragms and thus by their outward movement the shock is absorbed and water hammer prevented.

It oftentimes happens that pressure in the line entering the building tends to increase and to prevent such increase of pressure causing leakages in the house system or disarrangement of apparatus open to the water lines in the house this device of Fig. 2 in conjunction with an additional element may be used to instantly relieve such pressure. To accomplish that I provide the structure illustrated in Figs. 4 and 5. The shells 1 are the same as before as well as the diaphragms and the brass ring with this exception, however, that the ring is provided as shown in Fig. 5 with an additional threaded aperture to receive the stem 20 of the outlet conduit which has a cross conduit 21 on a line extending between the center points of the diaphragms and with which the inner ends of the springs engage.

The outer end of this stem 20 extends outwardly of the ring and a nut 22 is provided threaded thereonto which may be of the nature of a coupling connecting the waste pipe 23 with this stem 20. This waste pipe (although not here shown) may extend to a sewer line. The cross conduit 21 is open and formed at each end to provide a seat for the valves 24 and 25 respectively which are attached to the inner face of the respective diaphragm within the chamber formed between the ring and the diaphragms. This conduit 20 and the valves should be formed of non-corrodible material in order to insure long life of the apparatus.

With the character of construction shown in Figs. 4 and 5 upon pressure between the diaphragms increasing to beyond that determined by the spring tension, the valves are lifted from the seats and this permits fluid to pass out through the stem 20 to the waste line 23 and, as long as pressure exists in this device in excess of the pressure determined by the spring tension, a constant leakage of water will occur. Thus, the house system will be protected from any excess pressure.

Occasionally a hot water system becomes overheated producing steam and causing hot water to be backed up in the cold water lines and sometimes the pressure may not be sufficient to operate diaphragms and cause relief or discharge of water when the invention is constructed according to Figs. 4 and 5.

To insure that the discharge conduit will be opened upon hot water entering the device, I provide a thermostat which consists of the thermostatic element 26 here shown as being U shaped, in form with the opposite ends attached to the levers 27 and 28 which are respectively pivotally secured at 29 to the inner periphery of the brass ring 5. The inner ends of these levers engage beneath the flanges of the respective valves 24 and 25 and thus upon the thermostatic element 26 becoming heated the levers are caused to separate at their outer ends tending to lift the valves from their seats and permitting flow of water through the element 21 to the waste line as will be understood. Thus, in this latter form of the device shown in Fig. 1 all the possible occasions for relieving the system of pressure or of hot water are incorporated.

In the embodiment of the invention shown in Fig. 4 any steady accumulation of pressure would be relieved as well as any sudden pressures such as water hammer and the device shown in Fig. 6 will perform all the functions of the device when arranged as shown in Figs. 1 or 4.

I have shown three forms of construction embodying my invention inasmuch as the device is usable in the three forms depending upon the specific purpose of use. There being installations in which no hot water can accumulate, the device shown in Fig. 4 would be sufficient but inasmuch as water hammer is a common trouble desired to be avoided and as the cost of the device shown in Figs. 4 and 6 may be excessive for such purpose the device shown in Fig. 1 may be utilized.

I have shown no vent in the chambers between the diaphragms and the respective shells in which the springs are located. However, such vent may be provided if desired. Due to the large volume of air in the respective spring chambers and diaphragms any compression of air caused by outward flexing of the diaphragms is not such as would prevent operation of the device. I therefore prefer to form the structure without a vent opening and thus prevent possibility of moisture entering these spring chambers.

From the foregoing description it is evident that the device is simple in construction; is of long life and practically indestructible in its normal use and function and that the various objects of the invention are secured by the structures shown.

Having thus fully described my invention, what I claim is—

1. A device of the character described comprising a casing formed of two chambered parts of like form, a ring like element therebetween, a diaphragm of disk form on each of the opposite side faces of the ring, means for securing the chambered parts and ring together and thereby clamping the diaphragms in place to prevent leakage between the diaphragms and the ring, a water inlet for the ring, a conduit opening through the ring and having an inlet at its inner end between the diaphragms, valve means in fixed relation with the diaphragms and controlling the inlet to the said conduit, means for preventing an outward deflection of the diaphragms under predetermined pressures and yieldable at pressures in excess thereof whereby the valve is moved to open the discharge conduit and permit an escape of fluid.

2. A device of the character described comprising a chambered casing formed of two-parti-spherical shells of like form, a ring secured therebetween, a diaphragm on each of the opposite side faces of the ring and clamped between the respective shell and the ring, an inlet conduit connected with the ring, and a discharge conduit opening at its inner end to the chamber formed between the diaphragms, valve means for closing the said discharge conduit connected with the diaphragms in such manner that upon the diaphragms being flexed outwardly the discharge conduit is opened, and yieldable means adapted to resist outward flexing of the diaphragms whereby the discharge conduit is maintained closed under predetermnied pressure and is opened on excess pressure.

3. A device of the character described comprising a chambered casing, a pair of diaphragms extending thereacross in spaced relation providing a central chamber and a chamber on the outer faces of each of the diaphragms, a water inlet for the chamber between the diaphragms, a discharge conduit therefor extending to the exterior of the casing, said conduit having an inlet at a point centrally between the diaphragms, valve means connected with the diaphragms, means acting to normally hold the diaphragms in non-flexed position thereby maintaining the discharge conduit closed by the valve, the arrangement providing that upon excess pressure of water in the chamber between the diaphragms, said diaphragms are outwardly flexed and the discharge conduit opened.

4. A device of the character described comprising a casing, a pair of diaphragms secured therein in spaced relation providing a central chamber, a water inlet for the chamber between the diaphragms adapted for connection with a pressure water supply, a discharge conduit for the said chamber and extending thereinto, a cross conduit approximately on the axial line of the two diaphragms and open at each end forming the inlet to the discharge conduit, a valve secured to the inner face of each of the diaphragms and adapted to engage the respective open end of the cross conduit, said ends being arranged to provide a seat for the valve, spring means exerting pressure on the exterior faces of the diaphragms tending to hold the same in normal position with the valves closed under predetermined pressure of water in the chamber between the diaphragms and yielding to an excess pressure whereby the valves are opened and fluid is permitted to discharge through the conduit.

5. A device of the character described comprising a casing or body, a pair of flexible diaphragms of disk like form secured therein in spaced relation providing a chamber therebetween, a water inlet for the said chamber adapted for connection with a water system, a discharge conduit arranged to discharge liquid to the exterior of the chamber and having an inlet between the diaphragms, valve means controlled by the diaphragms and normally closing the discharge conduit inlet under normal position of the diaphragms, yieldable means tending to hold the diaphragms in normal position under predetermined fluid pressures within the chamber, the diaphragms adapted to be outwardly flexed by excess pressure and thereby open the inlet of the discharge conduit, a thermostatic element in the said chamber, and a leverage means connected with the thermostatic element arranged on increase in temperature of fluid in the chamber to outwardly flex the diaphragms and thereby open the inlet end of the discharge conduit.

6. A device of the character described comprising a casing, a pair of diaphragms supported therein and providing a chamber therebetween, an inlet for said chamber, said diaphragms being of a character to be flexed outwardly by pressure in the chamber, yieldable means preventing outward deflection of the diaphragms under predetermined fluid pressure, a discharge conduit for the chamber having an inlet between the diaphragms, valve means for controlling flow therethrough, a thermostat for controlling the valve means adapted to open the discharge inlet on an increase in temperature of the fluid beyond a predetermined degree and permit the same to close at temperatures below said predetermined degree, and spring means tending to close the valve means.

7. A device for preventing water hammer in water supply systems comprising a hollow casing, a pair of flexible diaphragms mounted in spaced relation therein separating the casing into a central compartment between the diaphragms and compartments on respective opposite sides sealed to the central compartment, an inlet for the central compartment providing the sole means of communication with the water system whereby the diaphragms are subject to deflection by variations in pressure in the water system, and yieldable means operatively associated with each of the diaphragms providing the sole means for preventing outward deflection thereof under certain water pressure and permitting deflection under sudden and excess pressure in the water system known as "water hammer".

8. A device for preventing water hammer in water supply systems comprising a hollow casing formed of two parti-spherical shells of similar form, a ring secured between the opposed edges of the two shells, a diaphragm on each of the opposite side faces of the ring and held in contact at its edges between the respective shells and ring, an inlet conduit opening to within the ring, said conduit providing the sole means of communcation with the water system whereby water under pressure may enter the chamber provided between the two diaphragms, a spring on the outer face of each of the diaphragms adjustable in tension to correspond to the normal pressure of the water in the system whereby a sudden and excess pressure known as "water hammer" may be relieved by deflection of the diaphragms and springs.

In testimony whereof I sign this specification.

EDWARD W. N. BOOSEY.